Figure 1:
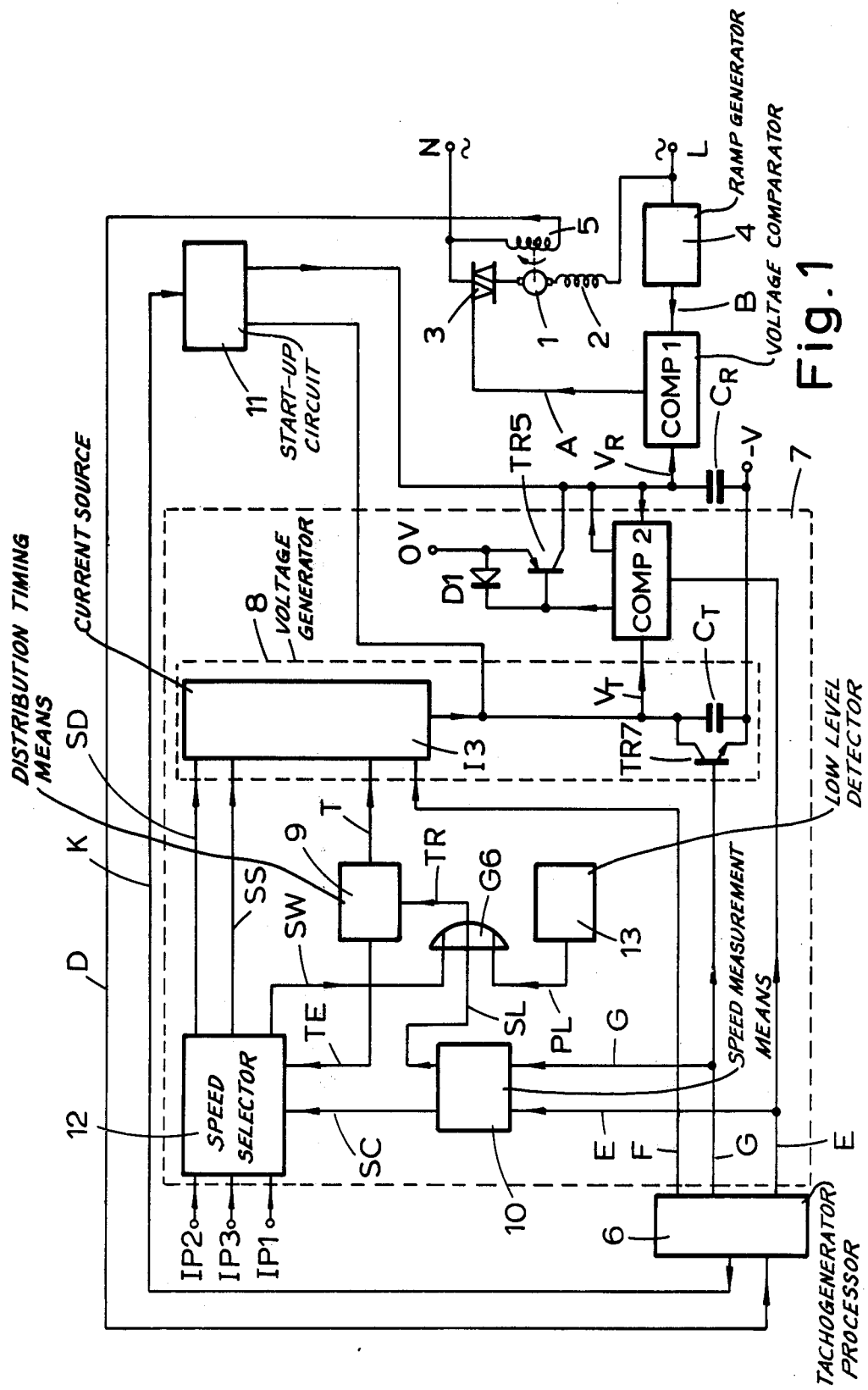

United States Patent [19]

Armstrong

[11] 4,150,303
[45] Apr. 17, 1979

[54] MOTOR SPEED CONTROL CIRCUITS

[75] Inventor: Desmond R. Armstrong, Wallington, England

[73] Assignee: U.S. Philips Corporation, New York, N.Y.

[21] Appl. No.: 814,282

[22] Filed: Jul. 11, 1977

[30] Foreign Application Priority Data

Jul. 16, 1976 [GB] United Kingdom ............... 29698/76

[51] Int. Cl.² ............................................. H01H 47/00
[52] U.S. Cl. .................................... 307/140; 68/12 R; 307/141; 318/484
[58] Field of Search ............... 318/484, 308, 306, 391, 318/400; 307/141, 141.4, 140; 68/12 R; 361/28, 29

[56] References Cited

U.S. PATENT DOCUMENTS

| 3,640,098 | 2/1972 | Eastall | 68/12 R |
| 3,783,651 | 1/1974 | Karklys | 307/141 |
| 3,939,673 | 2/1976 | Thibaut | 68/12 R |

*Primary Examiner*—David Smith, Jr.
*Attorney, Agent, or Firm*—Thomas A. Briody; William J. Streeter; Bernard Franzblau

[57] ABSTRACT

A motor speed control circuit for use in a washing machine includes a timer which in normal operation accelerates the motor from a wash speed to a distribution speed before a fast acceleration to the spin dry speed. The control circuit includes speed measurement means for maintaining the motor at spin speed in the event of a power interruption during a spin cycle provided the drum speed remains above a given critical speed when the power returns. If not, a redistribution cycle takes place before the motor is accelerated to its spin speed.

8 Claims, 18 Drawing Figures

MOTOR SPEED CONTROL CIRCUITS

This invention relates to a control circuit for controlling the speed of an electric motor coupled to a tachogenerator and arranged to rotate the clothes drum of a clothes washing and spin drying machine about a non-vertical axis. The control circuit includes a controlled solid state switch for connection in series with the motor such that power is supplied as a pulse to the motor while the switch is turned on and means for providing a reference voltage whereby the proportion of time for which the switch is turned on is dependent on said reference voltage. The control circuit further comprises means for processing the tachogenerator output signal to provide negative feedback information, and means to adjust said reference voltage in response to both said negative feedback information and speed selection input information. The means to adjust said reference voltage includes distribution timing means which provides a predetermined output signal when a predetermined time has elapsed after it has been enabled and which is reset by an interruption of electrical power to the control circuit. Adjustment of said reference voltage to a value for spin drying in response to spin speed selection input information is provided in normal operation by said predetermined output signal from the distribution timing means with the reference voltage at a value at which the clothes are distributed around the drum.

A control circuit as described above is known from United Kingdom Pat. Specification No. 1,266,691. In that Specification a circuit is shown and described in which a thyristor is connected in series with a d.c. series motor and an a.c. power supply. The thyristor is turned on in alternate half-cycles of the a.c. power supply with a conduction angle dependent on a reference voltage which is normally set to a value for washing speed. The tachogenerator output voltage is rectified and applied as a negative feedback to adjust the reference voltage. On initiation of a spin drying operation a time dependent circuit which includes a capacitor and first and second transistors is actuated by a switch. The capacitor controls the conductivity of the first transistor for modifying the reference voltage in such a sense as to produce a relatively slow acceleration of the motor. When the conductivity of the first transistor has reached a predetermined value at which the clothes are distributed around the drum it switches on the second transistor to which it is connected. The second transistor is arranged to rapidly attain a condition of maximum conduction and in so doing to modify the reference voltage in such a sense as to produce a relatively rapid acceleration of the motor to spin drying speed. The circuit is arranged so that if the motor is switched off by interrupting the power supply when it is running at spin speed, the capacitor of the time dependent circuit will discharge completely and then when the power supply is restored the controlled acceleration described above will recommence from the washing speed.

We have found that, in practice, a high percentage of power supply interruptions which occur in the operation of the type of control circuit described in the opening paragraph are of a short duration such that when the power supply is restored after a power interruption the motor is still running above a speed at which clothes are distributed around the drum. These short power interruptions can be due to the operation of switches at the power station which provides the AC supply. A disadvantage of the last mentioned feature of the circuit arrangement of U.K. Pat. Specification No. 1,266,691 is that it will nevertheless respond to such short duration power supply interruptions to redistribute the clothes from the washing speed under the control of the time dependent circuit. Each such unecessary redistribution will waste time during which the drum could be rotating at spin drying speed, and furthermore if the spin drying operation is terminated after a preset time under the action of a programmer then the clothes will have been spun dry for a shorter time than expected and will not be as dry as they should otherwise be. An object of the present invention is to overcome this disadvantage.

According to the present invention a control circuit as described in the opening paragraph of this specification is characterised in that said means to adjust said reference voltage further includes speed measurement means responsive to the tachogenerator output for providing a predetermined output signal if the motor speed is above a predetermined critical speed which is above the speed at which clothes are distributed around the drum but below the spin drying speed, and gating means responsive to said output signal of the speed measurement means after an interruption of electrical power to the control circuit to enable said reference voltage to be adjusted to said value for spin drying in the absence of said predetermined output signal of the timing means.

According to a first preferred feature of the invention, said means for processing the tachogenerator output, in the case where the tachogenerator provides an a.c. output whose frequency is proportional to the rotational speed, includes voltage level detection means responsive to said a.c. output, key pulse producing means responsive to at least one output of the detection means to produce in alternate cyclic periods of said a.c. output a key pulse whose duration is inversely proportional to the rotational speed, and first gating means responsive to a further output of the detection means and an output of the first gating means to produce a reset pulse after a sample period and in the interval between successive key pulses. The means to adjust said reference voltage includes a voltage generator responsive to each reset pulse to provide a predetermined output level and responsive to each key pulse to ramp that output level for the duration of that key pulse at a predetermined rate dependent on said speed selection input information and the condition of said distribution timing means and said speed measurement means, and said means to adjust said reference voltage is adapted to make the adjustment according to the output level of the voltage generator during each sample period.

The advantage of the above first preferred feature is that the output level of the voltage generator, during each sample period is a function of the tachogenerator output frequency, and hence the speed of a rotor of the tachogenerator, but is essentially not dependent on the tachogenerator output signal amplitude. This is an alternative to known means for processing a tachogenerator output which consist of a circuit in which the tachogenerator output is rectified and smoothed to give a d.c. output which is a function of the tachogenerator output amplitude.

The detection means included in the above first preferred feature of the invention may be responsive to first and second voltage levels of said tachogenerator a.c. signal of opposite polarity to provide corresponding first and second outputs, and furthermore the key pulse producing means may be a JK flip-flop comprising a master bistable circuit which is clocked by said first output of the detection means and a slave bistable circuit which is clocked by said second output of the detection means. In this case a substantial degree of noise immunity is provided from noise on the tachogenerator output which does not cross both the first and second voltage levels.

According to a second preferred feature of the invention, the means for processing the tachogenerator output according to the above first preferred feature of the invention includes a second gating means responsive to yet another output of the detection means and an output of the Key producing means to produce a sample pulse during each sample period, and furthermore said speed measurement means includes a further voltage generator responsive to each reset pulse to provide a predetermined output level thereof and adapted to ramp its output level at a predetermined rate between the reset pulses, further comparison means responsive to each sample pulse to make a comparison of the output level of said further voltage generator with a voltage level representative of said predetermined critical speed, and a bistable circuit responsive to an output of said further comparison means to provide said predetermined output signal.

An advantage of this second preferred feature of the invention is that the bistable circuit gives a certain answer as to whether the motor is above or below the critical speed within a short time after the power supply is restored, that is as soon as the reset and sample pulses are re-established by the means for processing the tachogenerator output.

According to a third preferred feature of the invention, irrespective of the presence or absence of the above first or second preferred features, the speed measurement means of the control circuit is adapted to provide a further output signal if the tachogenerator output indicates that the motor speed is below a further predetermined critical speed which is below washing speed, whereupon said distribution timing means is also reset by said further output signal.

An advantage of this third preferred feature of the invention is that it provides a corrective action if the motor drops or apparently drops to below washing speed for reasons other than an interruption of the power supply when it should be above washing speed, that is during distribution or spin. These reasons may be for example that the motor is stalled or partially due to an excessively heavy load or that the tachogenerator output is temporarily faulty due to an open circuit. In this case resetting the distribution timing means will provide the corrective action of a re-distribution operation.

Figure 2:
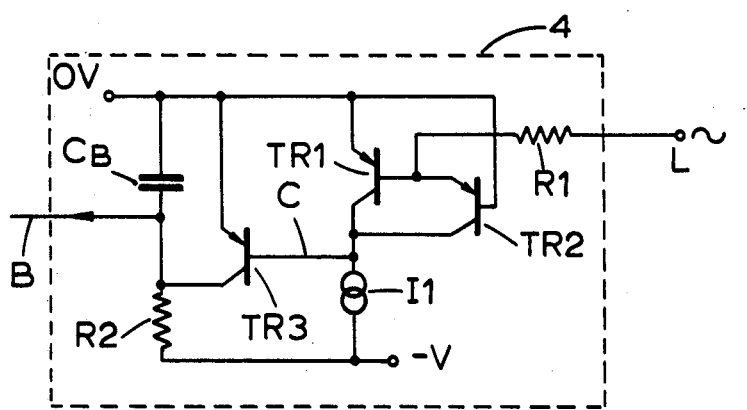
Figure 3:
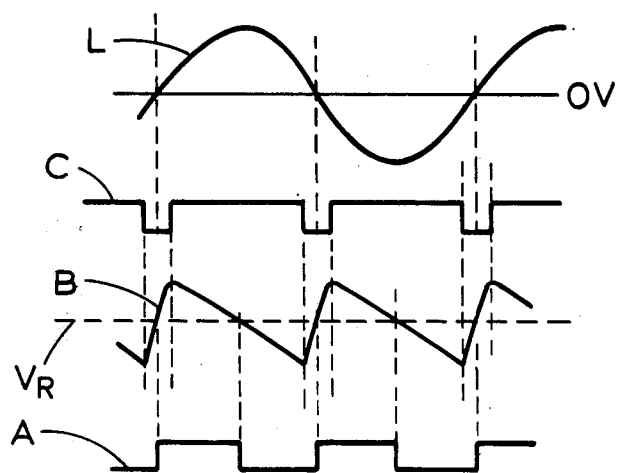
Figure 4:
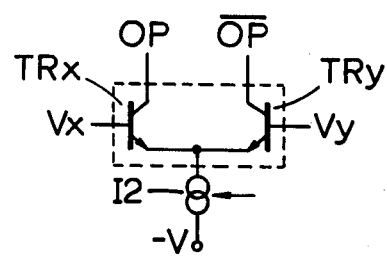
Figure 5A:
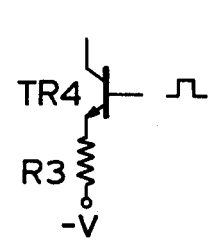
Figure 5B:
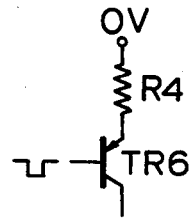
Figure 7:
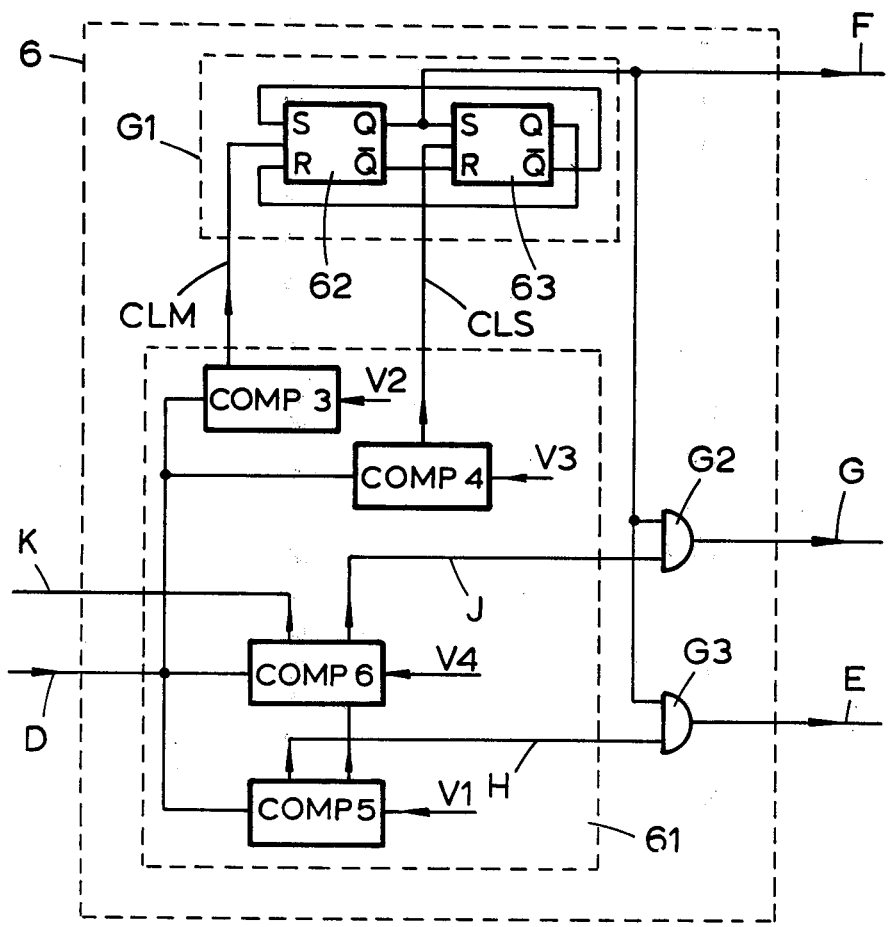
Figure 8:
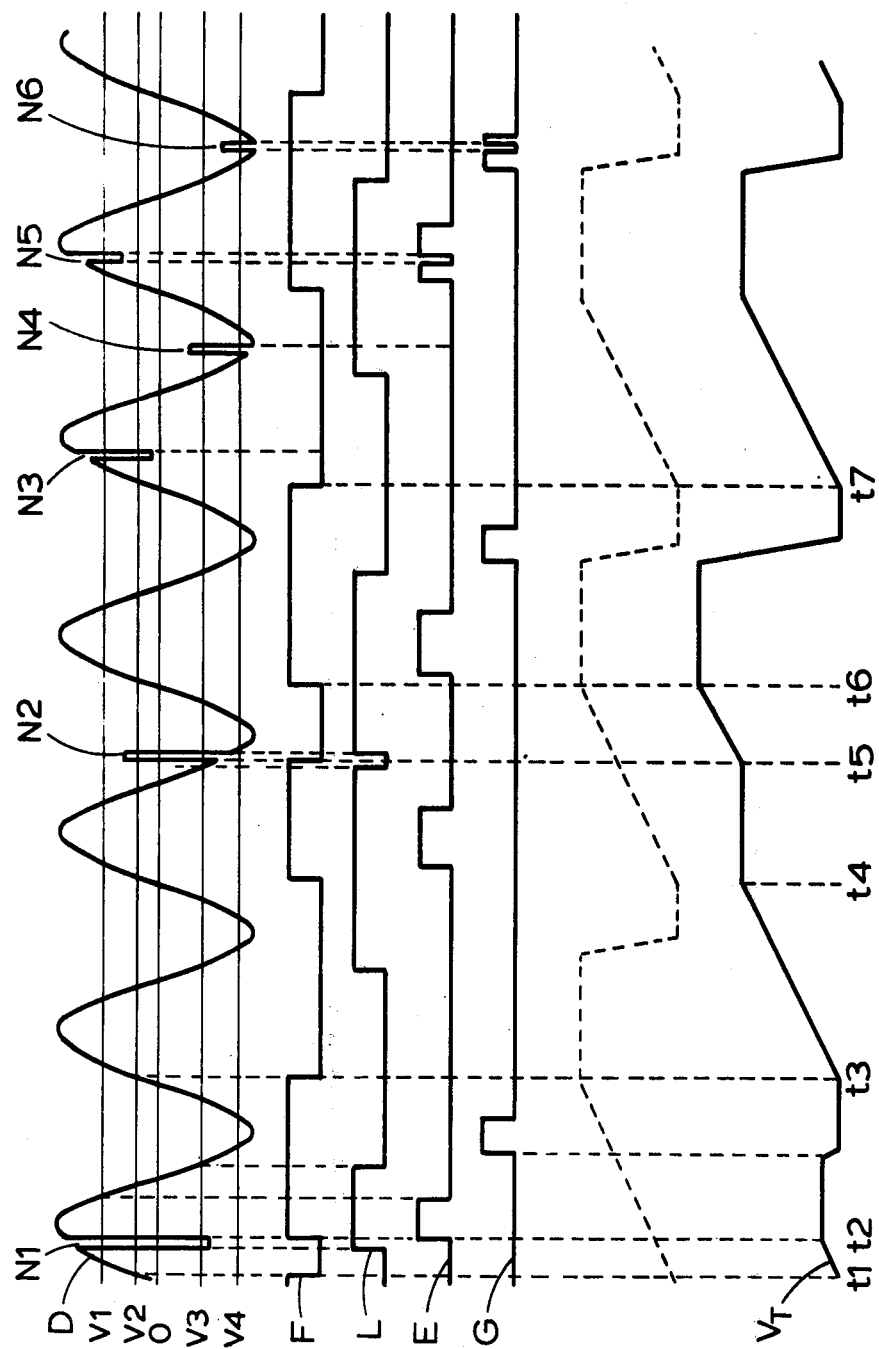
Figure 9:
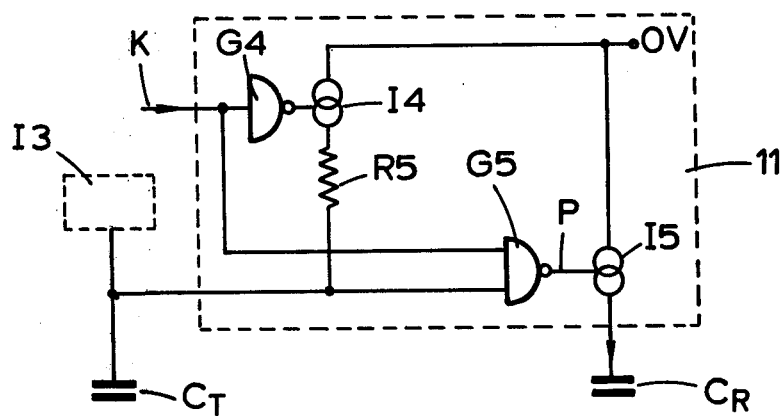
Figure 17:
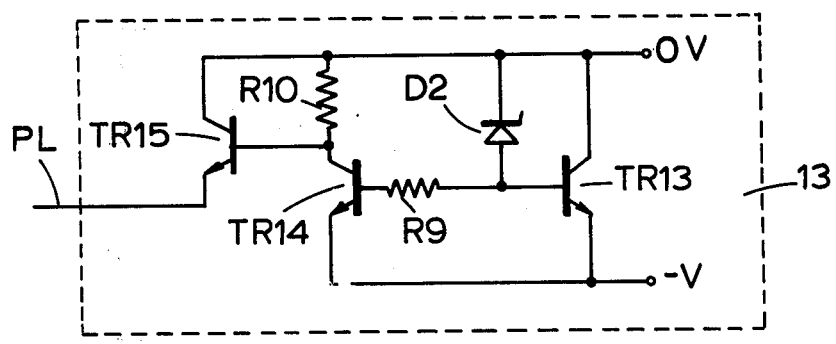
Figure 10:
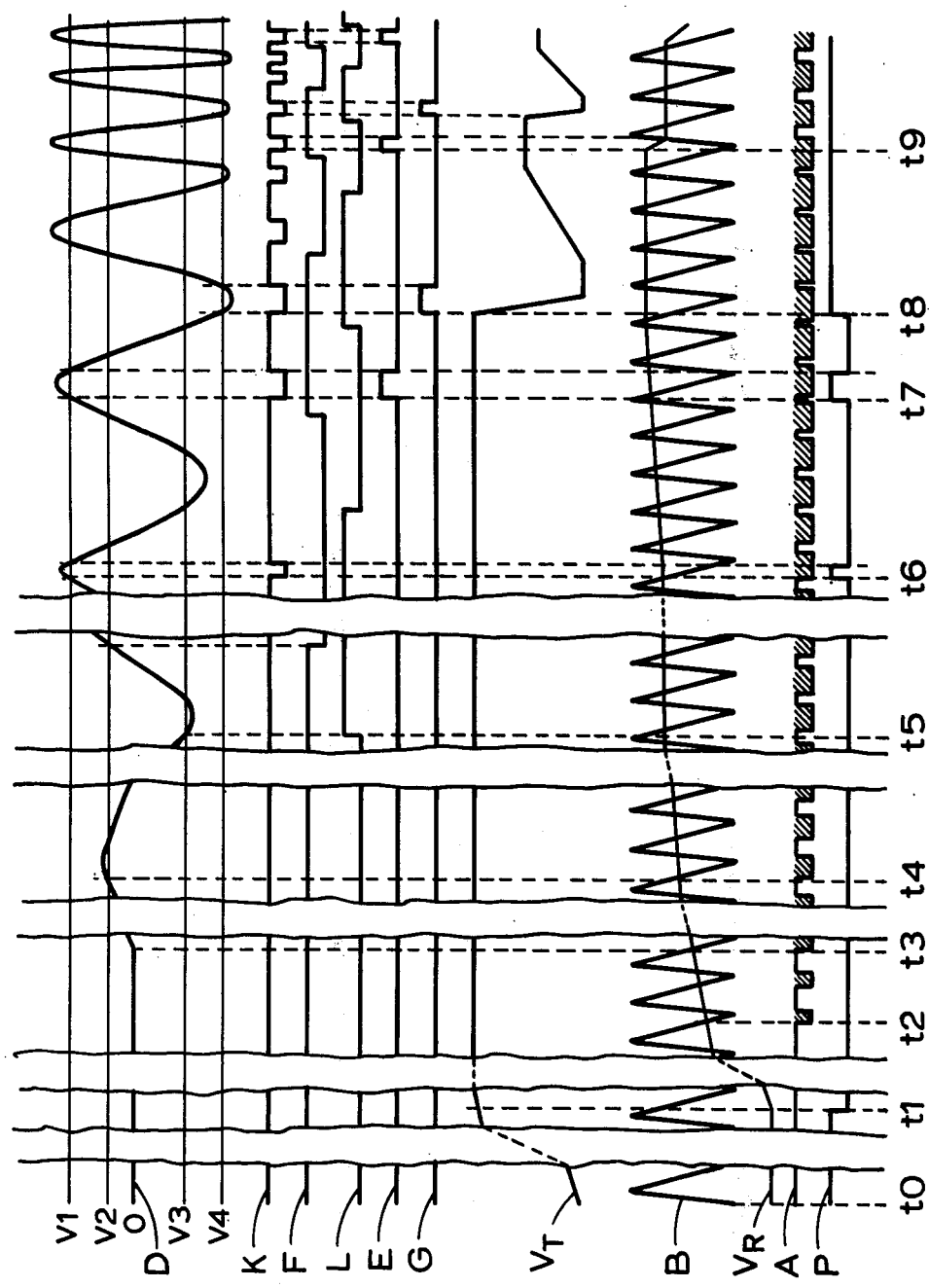
Figure 11:
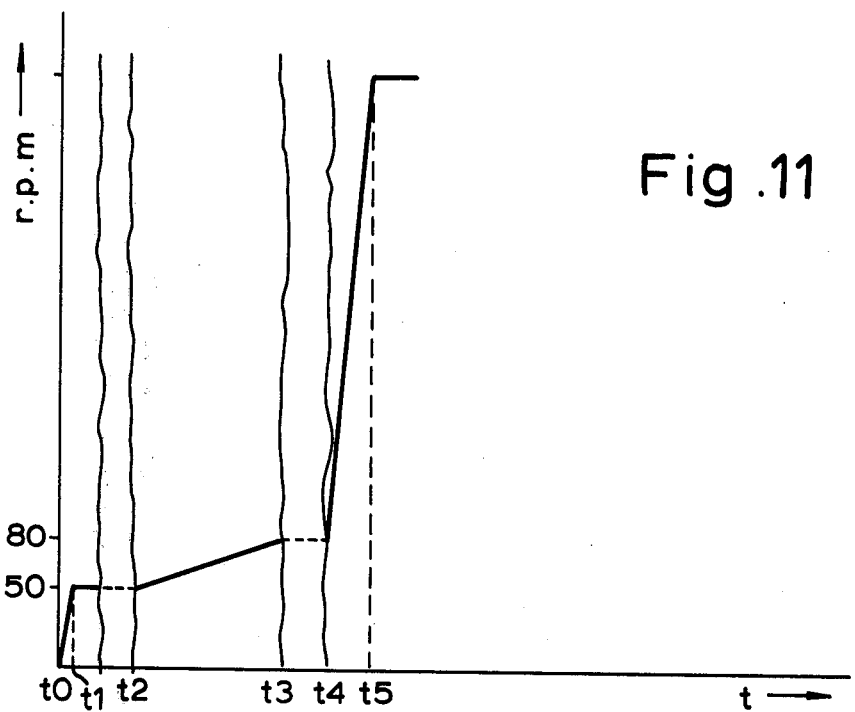
Figure 15:
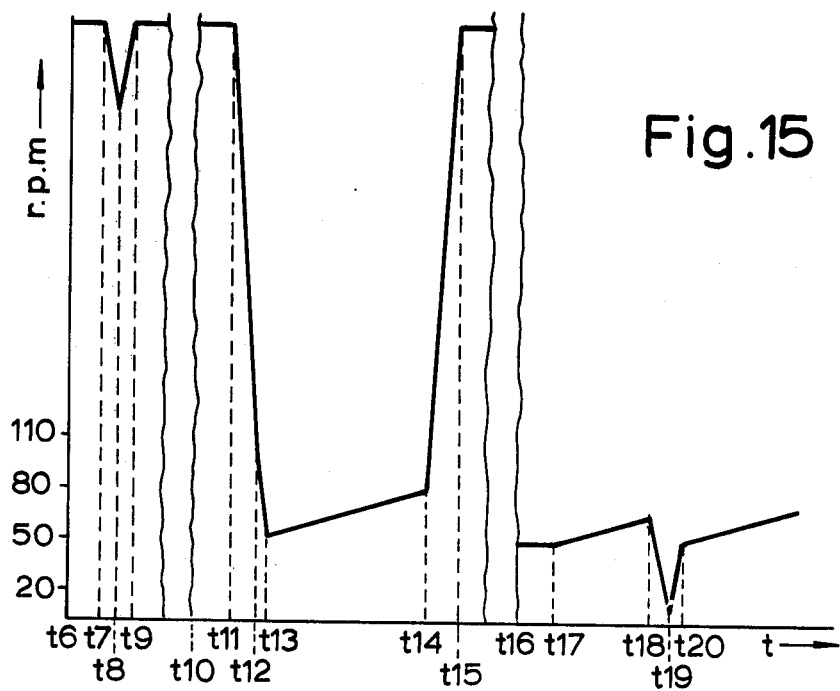
Figure 12:
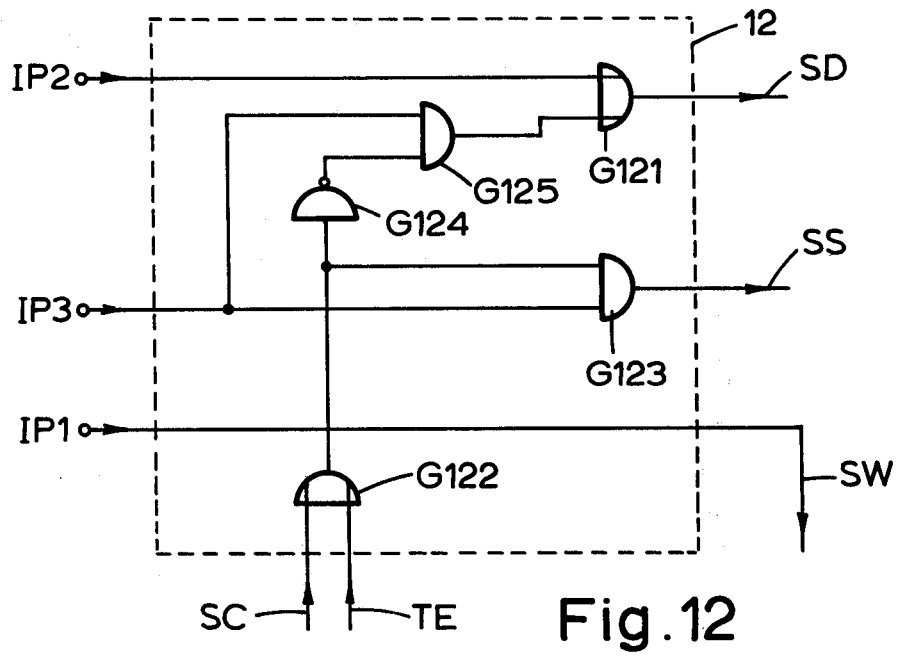
Figure 13:
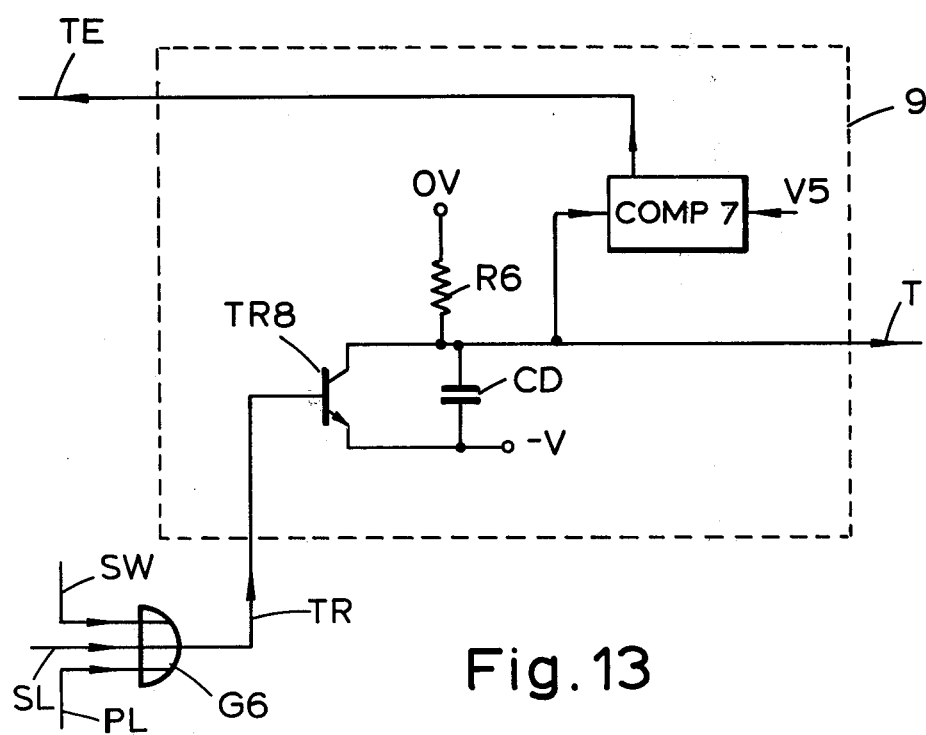
Figure 14:
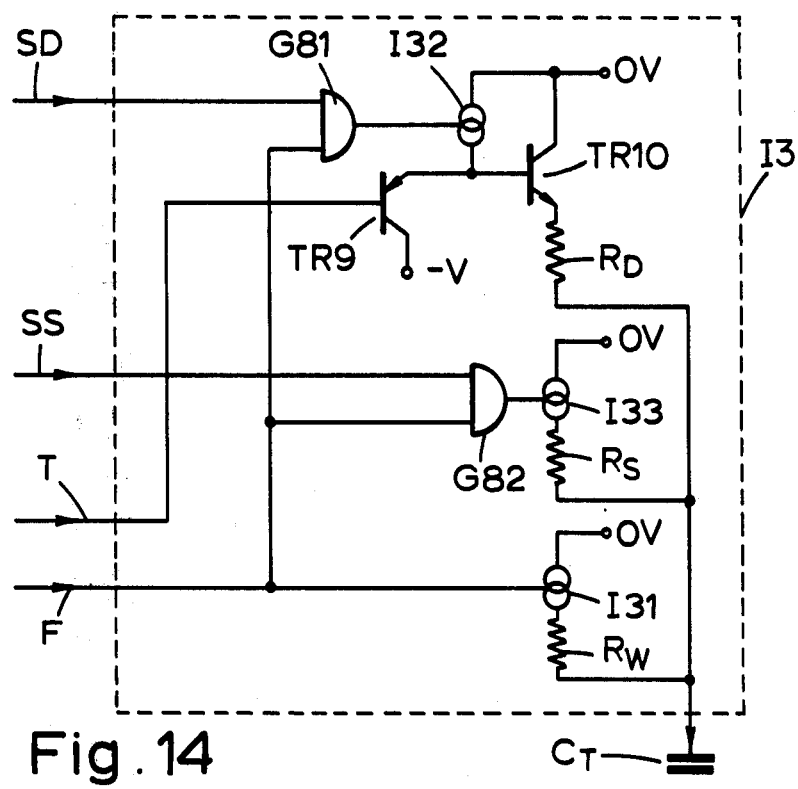
Figure 16:
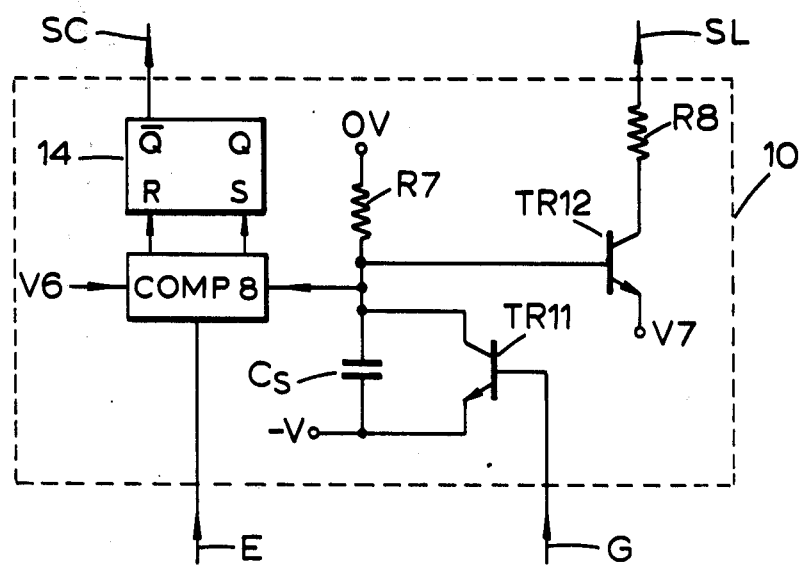

An embodiment of the invention will now be described with reference to the accompanying drawings, in which:

FIG. 1 shows a mainly schematic circuit diagram of a motor speed control circuit according to the invention, FIG. 2 shows the details of a ramp generator circuit which is a part of the circuit of FIG. 1, FIG. 3 shows voltage waveforms associated with FIGS. 1 and 2, FIG. 4 shows the details of each of the voltage comparators shown in FIG. 1, FIGS. 5A and 5B show the details of current sources shown in FIGS. 1, 2 and 4, FIG. 6 shows voltage waveforms of the circuit of FIG. 1 operating at steady speed, FIG. 7 shows the details of a tachogenerator signal processing circuit which is a part of the circuit of FIG. 1, FIG. 8 shows voltage waveforms illustrating the effect of noise pulses on the circuit of FIG 1, FIG. 9 shows the details of a start-up circuit which is a part of the circuit of FIG. 1, FIG. 10 shows voltage waveforms illustrating start-up of the circuit of FIG. 1, FIG. 11 is a graph of washing machine drum speed against time in response to two typical washing and spin drying programmes in normal operation, FIG. 12 shows the details of a speed selector which is a part of the circuit of FIG. 1, FIG. 13 shows the details of the distribution timing means which are a part of the circuit of FIG. 1, FIG. 14 shows the details of a composite current source which is a part of the circuit of FIG. 1, FIG. 15 is a graph of washing machine drum speed against time in response to power supply interruptions and low drum speed for reasons other than power supply interruptions, FIG. 16 shows the details of the speed measurement means which are a part of the circuit of FIG. 1, and FIG. 17 shows the details of a low level power supply detector which is a part of the circuit of FIG. 1.

Referring now to FIG. 1, an electric motor has an armature 1 and a field winding 2 both connected in series with a triac 3 between the line terminal L and the neutral terminal N of an A.C. power supply. In operation, power is supplied as a pulse to the motor during each half cycle of the supply, each power pulse commencing when the triac 3 is turned on by application to its gate electrode of a voltage of appropriate level in an output signal A from a voltage comparator COMP1. The voltage comparator COMP1 provides the appropriate level of the signal A when the voltage of the output signal B of a ramp waveform generator 4 goes below a reference voltage $V_R$ which is present on a reference capacitor $C_R$. Under steady conditions, the reference voltage $V_R$ is constant at a value appropriate to a selected speed of the motor.

Referring to FIGS. 2 and 3, the ramp waveform generator 4 and its operation are shown in detail. The alternating voltage on the line terminal L of the A.C. power supply is applied via a suitable voltage dropping resistor R1 to the base and emitter respectively of two transistors TR1 and TR2. The emitter and base respectively of the transistors TR1 and TR2 are connected to a positive voltage rail OV which is also the voltage of the neutral terminal of the A.C. power supply, and the collectors of both transistors TR1 and TR2 are connected via a current source I1 to a negative voltage rail $-V$. The collectors of the transistors TR1 and TR2 are also connected to the base of a transistor TR3 whose emitter is connected to the positive voltage rail OV and whose collector is connected via a resistor R2 to the negative voltage rail $-V$. A capacitor $C_B$ is connected between the positive voltage rail OV and the collector of the transistor TR3.

When the A.C. supply voltage L is low, that is to say close to OV, then the transistors TR1 and TR2 both do not conduct and so the current source I1 can switch on the transistor TR3. The periods during which the transistor TR3 is switched on are shown by the lower level portions of the pulse voltage waveform C; and during these periods the transistor TR3 discharges the capacitor $C_B$ towards the positive rail 0V which is shown by the rising portion of the ramp voltage waveform B. During each half cycle of the A.C. supply when the voltage at the terminal L is sufficiently positive or sufficiently negative, the transistor TR2 or the transistor TR1 respectively will conduct and the transistor TR3 will be switched off. The capacitor $C_B$ will charge during this time via the resistor R2 towards the negative voltage rail $-V$ which is shown by the falling portion of the ramp voltage waveform B.

The voltage comparator COMP1, shown in FIG. 1 which compares the reference voltage $V_R$ and the ramp voltage waveform B, may be realised as shown in FIG. 4 as a long tailed pair composed of transistors TRx and TRy. The transistors TRx and TRy are operative to compare the voltages Vx and Vy applied to their respective bases ($V_R$ and B in the case of COMP1) when a current source I2 connected between the two emitters and the negative voltage rail $-V$ is gated on. The current source I2 may be realised as shown in FIG. 5A as a transistor TR4 connected via a resistor R3 to the negative voltage rail $-V$ and it is therefore gated on when a sufficiently positive voltage is applied to its base. Referring back to FIG. 4, when the voltage Vx is greater than the voltage Vy the transistor TRx conducts and the transistor TRy does not conduct, and vice versa. The conducting and non-conducting conditions of the transistors TRx and TRy can be applied by the respective outputs OP and OP of the voltage comparator as the presence or absence of currents or, via suitable resistances, as voltages of high or low value. In FIG. 1 the voltage comparator COMP1 is shown as having only one output since only one output is used to provide the voltage output signal A, and no gate is shown because this voltage comparator is arranged to be permanently gated on.

Referring now to FIGS. 1 and 3, the triac 3 is turned on during each half cycle of the A.C. supply when the voltage waveform A at the output of the comparator COMP1 is at its lower level in response to the voltage of the ramp waveform B being below the reference voltage $V_R$. If the reference voltage $V_R$ is high then the voltage of the ramp waveform B goes below the reference voltage $V_R$ and the lower level of the waveform A commences early in each half cycle of the A.C. supply whereby a large amount of power is supplied to the motor to keep it rotating at a high speed corresponding to the high reference voltage $V_R$. A tachogenerator 5 coupled to the motor provides an a.c. output waveform D whose frequency is proportional to the rotational speed. The waveform D is processed by a processor 6, which will be described in detail later, to provide negative feedback information in the form of pulse voltage waveforms E, F, and G. The value of the reference voltage $V_R$ is adjusted by reference voltage adjustment means 7 in response to this negative feedback information and in response to speed selection information applied to inputs IP1, IP2 and IP3 from a programmer (not shown).

Referring to FIG. 1, the reference voltage adjustment means 7 includes a voltage generator 8 whose output voltage $V_T$ is compared with the reference voltage $V_R$ in a voltage comparator COMP2 when that comparator is gated on by a sample pulse voltage waveform E in alternate periods of the a.c. output waveform D. The voltage comparator COMP2 may be realised in the form already described with reference to FIGS. 4 and 5A. A diode D1 and a transistor TR5 have their anode and emitter respectively connected to the positive voltage rail 0V, and their cathode and base respectively connected to one of the outputs of the comparator COMP2. The collector of the transistor TR5 is connected to one side of the reference capacitor $C_R$ the other side of which is connected to the negative voltage rail $-V$. The diode D1 and transistor TR5 form a current mirror such that, if the voltage $V_T$ is greater than the reference voltage $V_R$ on the capacitor $C_R$ when the comparator COMP2 is gated on, then a current which flows into the output of the comparator COMP2 which is connected to the current mirror turns on the transistor TR5 which provides a charging current to the capacitor $C_R$ to increase the voltage $V_R$. If the voltage $V_T$ is less than the reference voltage $V_R$ when the comparator COMP2 is gated on, then current flows into the other output of the comparator COMP2 which is connected to the capacitor $C_R$ so as to provide a discharge current for the capacitor $C_R$ to decrease the voltage $V_R$. If the voltages $V_T$ and $V_R$ are equal when the comparator COMP2 is gated on, then equal currents flow into both outputs of the comparator COMP2 and the reference capacitor $C_R$ is neither charged nor discharged.

The voltage $V_T$ provided to the comparator COMP2 by the output of the voltage generator 8 is the voltage on one side of a ramp capacitor $C_T$ the other side of which is connected to the negative voltage rail $-V$. The side of the ramp capacitor $C_T$ opposite the negative voltage rail $-V$ is also connected to a current source I3. The current source I3 is gated on by the pulse output voltage waveform F supplied by the processor 6, and the value of the current supplied by the current source I3 when it is gated on is dependent on the speed selection information applied to the inputs IP1, IP2 and IP3, the condition of distribution timing means 9 and the condition of speed measurement means 10. The current source I3, the distribution timing means 9 and the speed measurement means 10 will be described in detail later.

Figure 6:
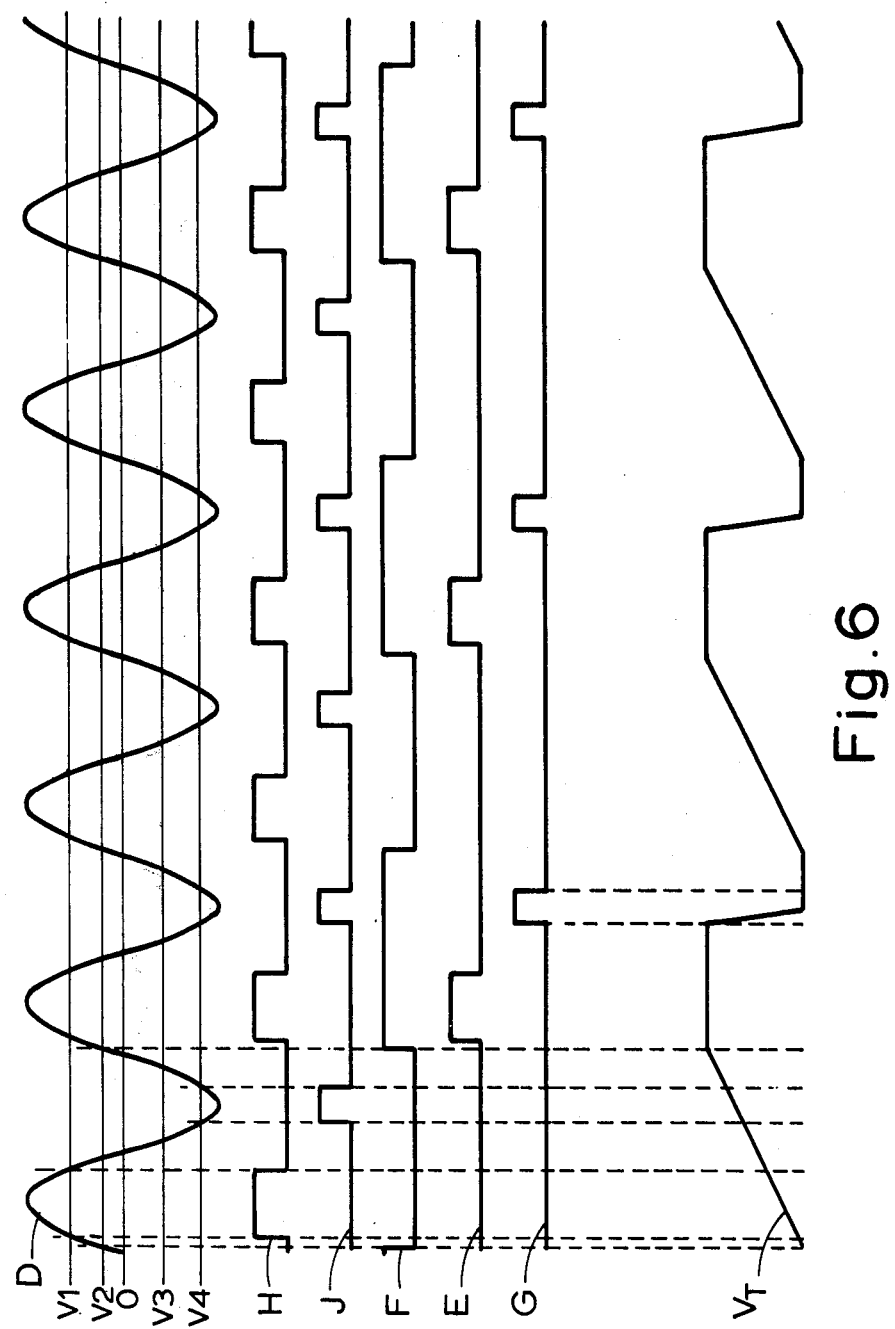

As can be seen in FIG. 6, the pulse voltage waveform F is at a low voltage level for alternate whole periods of the tachogenerator waveform D. During each low level period of the voltage waveform F, the current source I3 is gated on and a charging current is provided from the current source I3 to the ramp capacitor $C_T$ to ramp the voltage $V_T$ in a positive direction from the negative voltage rail $-V$. Each low level period of the voltage waveform F may be termed a key pulse. In the interval between each key pulse the voltage $V_T$ is unchanged for a sample period during which the comparator COMP2 is gated on by the sample pulse waveform E. After the sample period and in the interval between each key pulse, a transistor TR7 connected across the ramp capacitor $C_T$ in the voltage generator 8 is switched on by a reset pulse waveform G and the ramp capacitor $C_T$ discharges to ramp the voltage $V_T$ in a negative direction back to the negative voltage rail $-V$. The rate of discharge of the ramp capacitor $C_T$ is arranged so that the voltage $V_T$ will come back to the negative voltage rail $-V$ during the shortest possible full reset period provided by the reset pulse waveform G from the most positive possible level of the voltage $V_T$. Thus the voltage $V_T$ starts from the same predetermined level $-V$ at the beginning of each key pulse provided by the voltage waveform F. The value of the voltage $V_T$ which is reached at the end of each key pulse therefore depends on the duration of that key pulse and the slope of the ramp voltage during said key pulse. The duration of each key pulse is one whole period of the tachogenerator waveform D and is therefore inversely proportional to the rotational speed. The slope of the ramp voltage during each key pulse is determined by the value of the charging current supplied to the capacitor $C_T$ by the current source I3. Under steady conditions with the motor rotating at a selected speed, the capacitor $C_T$ will be charged during each key pulse at a rate determined by a corresponding value of the current from the source I3 for a time determined by the duration of the key pulse so that the value of the voltage $V_T$ reached at the end of the key pulse is a predetermined value corresponding to the given selected motor speed. Under steady conditions with the motor rotating at the selected speed the reference voltage $V_R$ on the capacitor $C_R$ will be the same as the voltage $V_T$, and the reference voltage $V_R$ will determine the amount of power supplied to the motor which is appropriate to rotate it at that selected speed.

If the motor is rotating at a selected speed and then the load on the motor increases so as to decrease that speed, the feedback system will behave as follows. The decrease in speed will decrease the frequency of the output D of the tachogenerator 5 which will proportionally increase the duration of the key pulses in the waveform F derived from the output D. The increased duration of the positive ramp of the voltage $V_T$ during each key pulse will increase the value of $V_T$ above the value of $V_R$. The voltage $V_T$ then is gated to the comparator COMP2 during the succeeding sample period. The comparator COMP2 will act, as has been previously described, to raise the value of $V_R$ which will result in more power being supplied to the motor to raise its speed which in turn will decrease the value of $V_T$ until the system stabilises after a plurality of rotations and corresponding adjustments by the comparator COMP2 with the motor back at its selected speed and the voltages $V_T$ and $V_R$ back at their corresponding predetermined equal values. A decrease in the load on the motor so as to increase the speed will result in the feedback system behaving in an inverse manner to that just described so as to also bring the motor back to its selected speed.

If the motor is rotating at a selected speed, a change to a new selected speed can be achieved by changing the value of the current supplied by the current source I3. The response of the system to a change in the value of this current will be apparent from the explanation of the system as described so far. Briefly, to increase the speed the value of the current supplied by the source I3 is increased which will increase the value of $V_T$ above the existing value of $V_R$ at the end of the key pulse of duration corresponding to the initial speed, and moreover above the value of $V_T$ required for the new speed. The value of $V_R$ will thus be increased resulting in an increased speed giving a shorter duration key pulse with a decreased value of $V_T$, so that $V_T$ decreases and $V_R$ increases over a plurality of periods of rotation until they are both equal at the new predetermined higher value corresponding to the new higher selected speed.

If the motor is stationary, the capacitor $C_R$ will have a predetermined voltage $V_R$ at a value more negative than the most negative value reached by the ramp waveform B supplied by the ramp generator 4 from the AC supply. In this case, as will be seen from FIG. 3, no power will be supplied to the motor. A start-up circuit 11 is provided which is turned on under these conditions to raise the the voltage $V_R$ until the motor turns and which is turned off when the system is operating normally. This will be explained in more detail later.

The tachogenerator output processor 6 shown in FIG. 1 is shown in more detail in FIG. 7, and it will now be described with reference to FIG. 7 in conjunction with FIG. 6. Voltage level detection means 61 are responsive to the tachogenerator a.c. output waveform D to provide clock outputs CLM and CLS to a key pulse producing means G1 which provides the pulse output voltage waveform F. The waveform F is also applied as one of two inputs to an AND gate G2 and an AND gate G3. The other inputs to the AND gates G2 and G3 are supplied from the voltage level detection means 61.

The tachogenerator output voltage waveform D is applied to four voltage comparators COMP3, COMP4, COMP5 and COMP6 where it is compared with four reference voltage levels V2, V3, V1 and V4 respectively. These four voltage comparators may each be realised as shown in FIG. 4 with resistors to give appropriate voltage level outputs. The voltage comparators COMP3, COMP4, and COMP5 are permanently gated on, but the voltage comparator COMP6 is only gated on when an appropriate output is supplied by the comparator COMP5. The four reference voltage levels V1, V2, V3 and V4 are shown in FIG. 6 relative to the voltage output waveform D of the tachogenerator 5.

The voltage waveform D is shown as alternating in polarity with respect to a zero voltage corresponding to the motor and hence the tachogenerator being at rest. The voltage levels V1 and V4 are of opposite polarity and they are asymmetric with respect to the zero voltage level for reasons concerned with the start-up system, as will be explained later. The reference voltage level of greatest magnitude, which is the negative polarity reference voltage level V4, is chosen to be considerably smaller than the smallest amplitude voltage which will be generated in practice by the tachogenerator at the lowest desired operating speed of the motor. In this way, the response of the voltage level detection means 61 is essentially not dependent on the tachogenerator output amplitude. The voltage levels V2 and V3 are of opposite polarity and are of magnitude less than that of the voltage levels V1 and V4 respectively.

The key pulse producing means G1 consists of a master bistable circuit 62 and a slave bistable circuit 63. The conditions of the set input S and the reset input R of the master bistable circuit 62 are clocked through to its Q and $\overline{Q}$ outputs respectively by the leading edge of the output CLM of the comparator COMP3 when the tachogenerator voltage goes more positive than the reference voltage V2. The Q and $\overline{Q}$ outputs of the master bistable circuit 62 are connected respectively to the set input S and the reset input R of the slave bistable circuit 63. The conditions of the set input S and the reset input R of the slave bistable 63 are clocked through to its Q and $\overline{Q}$ outputs respectively by the leading edge of the output CLS of the comparator COMP4 when the tachogenerator voltage D goes more negative than the reference voltage V3. The Q and $\overline{Q}$ outputs of the slave bistable circuit 63 are cross-connected respectively to the reset input R and the set input S of the master bistable circuit 62. This cross-connection ensures that the master and slave bistable circuits 62 and 63 behave together as a JK flip-flop in response to either one of the clock inputs CLM or CLS. That is to say that the master bistable circuit 62 changes state in response to each clock input CLM, providing that a clock input CLS has changed the state of the slave bistable circuit 63 in the period since the previous clock input CLM; and vice versa. The Q and $\overline{Q}$ output of the master bistable circuit 62 or the slave bistable circuit 63 can be used as a divide-by-two output responsive to the tachogenerator output voltage waveform D. As shown in FIG. 7 the Q output of the master bistable circuit 62 is used to provide the pulse waveform F shown in FIG. 6, i.e. key pulses of low voltage to the voltage generator 8 shown in FIG. 1 and an enabling high voltage to the AND gates G2 and G3 in the intervals between the key pulses. The advantage of using the two clock inputs CLM and CLS responsive to the two opposite polarity voltage levels V2 and V3 is that a substantial degree of immunity is thereby provided from noise on the tachogenerator output signal which does not cross both the voltage levels V2 and V3, as will be explained in more detail later.

The voltage comparator COMP5 provides a pulse voltage waveform H from one of its outputs. The voltage waveform H gives a positive pulse when the tachogenerator output voltage waveform D is more positive than the reference voltage V1. Alternate positive pulses in the waveform H are gated through by the AND gate G3 as positive voltage pulses on the sample pulse waveform E become more positive level of the voltage waveform F in the interval between each key pulse. The opposite phase output of the voltage comparator COMP5 gates on the voltage comparator COMP6 when the tachogenerator output voltage waveform D is less positive than the reference voltage V1. The voltage comparator COMP6 provides a pulse voltage waveform J from one of its outputs. The voltage waveform J exhibits a positive pulse when the tachogenerator output voltage waveform D is more negative than the reference voltage V4. Alternate positive pulses in the waveform J are gated through by the AND gate G2 as positive voltage pulses in the reset pulse waveform G by the more positive level of the voltage waveform F in the interval between each key pulse and after each positive pulse in the sample pulse waveform E. The opposite phase output of the voltage comparator COMP6 provides a pulse voltage waveform K which is at a more positive voltage level when the tachogenerator output voltage D is between the voltage levels V1 and V4 and is at a less positive voltage level when the tachogenerator is outside the voltage levels V1 and V4. The waveform K is provided as an input to the start-up circuit 11 shown in FIG. 1 and its effect will be described in more detail later.

The response of the system to noise on the tachogenerator output voltage waveform D, and in particular the degree of immunity to such noise provided by the arrangement and operation of the Key pulse producing means G1 will now be explained with particular reference to FIG. 8 which shows six examples of noise pulses N1 to N6 on the waveform D. FIG. 8 also shows the effect of these noise pulses on the voltage waveform F which is the Q output of the master bistable circuit 62 shown in FIG. 7, on a voltage waveform L which is the Q output of the slave bistable circuit 63 shown in FIG. 7, on the sample pulse voltage waveform E which is the output of the AND gate G3 shown in FIG. 7, on the reset pulse voltage waveform G which is the output of the AND gate G2 shown in FIG. 1, and on the voltage $V_T$ which is the output of the voltage generator 8 shown in FIG. 1 responsive to the waveforms F, E and G. The dotted outline waveform above the voltage $V_T$ (FIG. 8) shows that the voltage $V_T$ would be in response to the waveform D in the absence of the noise pulses N1 to N6.

The effects of the noise pulses N1 and N2 will first be described since these illustrate the worst case effects of noise pulses which cross both the voltage levels V2 and V3.

Assuming that a pulse in the waveform F starts a correct time t1 when the waveform D goes above the voltage level V2, then the voltage $V_T$ will begin to ramp up. If a negative noise pulse N1 then occurs during the same positive half cycle of the waveform D when it is above the voltage level V1 and crosses both voltage levels V2 and V3, then the effect will be as follows. The falling edge of the pulse N1 will clock the slave bistable circuit 63, waveform L, and therefore the succeeding rising edge of the pulse N1 will clock the master bistable circuit 62 at the time t2 stopping the ramp up of the voltage $V_T$ at an error low level which is gated to the comparator COMP2 by a positive sample pulse on the waveform E. However, the voltage $V_T$ will be reset when the waveform D next goes below the voltage level V3 and at the time t3 a key pulse will commence and ramp the voltage $V_T$ up to its correct level. Thus the system recovers its correct operation within one period of the tachogenerator output waveform D. Furthermore the value of the reference capacitor $C_R$ (see FIG. 1) is chosen such that the reference voltage $V_R$ can only change by a small amount during each comparison in the comparator COMP2 with the voltage $V_T$. Thus the effect of a single error in the voltage $V_T$ is very small.

Assuming that a key pulse in the waveform F stops at a correct time t4 when the waveform D goes above the voltage level V2, then the correct voltage level $V_T$ will have been reached. If, after that correct voltage $V_T$ has been sampled, a positive noise pulse N2 occurs during the following negative half cycle of the waveform D when it is between the voltage levels V3 and V4 and this noise pulse N2 crosses both voltage levels V3 and V2, then the effect will be as follows. The rising edge of the pulse N2 will clock the master bistable circuit 62 at the time t5. Thus a reset pulse is lost and a premature key pulse ramps up the voltage $V_T$ until the time t6 to an error high level which is then gated to the comparator COMP2 by the waveform E. However, the voltage $V_T$ will be reset when the waveform D next goes below the voltage level V3 and at the time t7 a key pulse will commence and ramp the voltage $V_T$ up to its correct level. Thus the system recovers its correct operation within two periods of the tachogenerator output waveform D, and the effect of a single error in the voltage $V_T$ is very small as has been explained with reference to the noise pulse N1.

Assuming again that a key pulse commences at the time t7 and the voltage $V_T$ commences to ramp up, then if a negative noise pulse N3 occurs during the same positive half cycle of the waveform D when it is above the voltage level V1 and crosses the voltage level V2 but not the voltage level V3 there is no effect. This is because the falling edge of the noise pulse N3 does not provide a clock input to change the state of the slave bistable circuit 63 and so the clock input to the master bistable circuit 62 provided by the rising edge of the noise pulse N3 does not change its state.

If a positive noise pulse N4 occurs during the following negative half cycle of the waveform D when it is below the voltage level V4 and crosses the voltage level V3 but not the voltage level V2 there is again no effect.

This is because the rising edge of the noise pulse N4 does not provide a clock input to change the state of the master bistable circuit 62 and so the clock input to the slave bistable circuit 63 provided by the falling edge of the noise pulse N4 does not change its state.

A negative noise pulse N5 which occurs during the higher voltage level of the waveform H (see FIG. 6) during the interval between key pulses and only crosses the voltage level V1 will interrupt the positive sample pulse E. The adjustment of the reference voltage $V_R$ to the voltage $V_T$ by the comparator COMP2 (see FIG. 1) will be interrupted for the duration of the noise pulse N5. As has been previously mentioned, the capacitor $C_R$ is chosen such that the reference voltage $V_R$ can only change by a small amount during each comparison in the comparator COMP2 with the voltage $V_T$. Thus the effect of the noise pulse N5 is very small.

A positive noise pulse N6 which occurs during the higher voltage level of the waveform J (see FIG. 6) during the interval between key pulses and only crosses the voltage level V4 will interrupt the positive reset pulse G for the duration of the noise pulse N6. However, as has been previously mentioned, the rate of discharge of the ramp capacitor $C_T$ is arranged such that the voltage $V_T$ will come back to the negative voltage rail $-V$ during the shortest possible full reset period provided by the reset pulse waveform G from the most positive possible level of the voltage $V_T$. Thus the effect of the noise pulse N6 will at the most be very small.

The start-up circuit 11 will now be described in more detail with reference to FIGS. 1, 9 and 10. The start-up circuit 11 includes two current sources I4 and I5, each of which may be realised as shown in FIG. 5B. The current source I4 is connected between the positive voltage rail OV and one side of a resistor R5. The other side of the resistor R5 is connected to the ramp capacitor $C_T$ and to one input of a NAND gate G5. The output voltage waveform K of the voltage comparator COMP6 (see FIG. 7) is connected via an inverter G4 to the gate of the current source I4 and directly to the other input of the NAND gate G5. The output of the NAND gate G5 is connected to the gate of the current source I5 which is connected between the positive voltage rail OV and the reference capacitor $C_R$.

FIG. 10 shows that at a time to shortly after power is turned on, the motor 1 is at rest and so the output waveform D of the tachogenerator 5 is at zero volts. The output waveform K of the voltage comparator COMP6 is thus at its more positive level appropriate to the waveform D being between the voltage levels V1 and V4. The master bistable circuit 62 and the slave bistable circuit 63 of the key pulse producing means G1 are in a random condition; and for the sake of example their output waveforms F and L are shown with F at its more positive voltage level (i.e. no key pulse) and with L at its less positive voltage level. The sample and reset waveforms E and G will be at their less positive voltage levels. The ramp capacitor $C_T$ is arranged such that its voltage $V_T$ is that of the negative voltage rail $-V$. The waveform B will be produced by the ramp waveform generator 4 from the AC supply, but the voltage $V_R$ of the reference capacitor $C_R$ will be that of the negative voltage rail $-V$, i.e at a level more negative than the most negative value reached by the waveform B. The output waveform A of the voltage comparator COMP1 will thus not turn on the triac 3 and no power will be supplied to the motor 1. Although the waveform K is at its upper voltage level, the voltage $V_T$ is so low that the NAND gate G5 will not be turned on and so its voltage output waveform P will be at a more positive voltage level which will not gate on the current source I5 to the reference capacitor $C_R$. The waveform K, inverted by the inverter G4 will, however, turn on the current source I4 which will supply a current at value determined by the resistor to the capacitor $C_T$ and so the voltage $V_T$ will begin to rise. If the random state of the master bistable circuit 62 had been such as to provide a key pulse to turn on the current source I3, this would have increased the current suplied to the capacitor $C_T$ and hence the rate of increase of the voltage $V_T$.

At a time t1, the voltage $V_T$ will reach a value, above that appropriate to any of the desired speeds of the motor, at which the NAND gate G5 will be turned on and the current source I5 will provide a charging current to the capacitor $C_R$ to raise the voltage level $V_R$. The voltage $V_T$ then remains at a maximum value. At a time t2 the waveform B will go below the voltage $V_R$ and so pulses in the waveform A will commence, turning on the triac 3 for a time during each half cycle of the AC supply thereby providing power to the motor 1. At a time t3 the motor 1 starts rotating and the waveform D commences at a low voltage and low frequency. The voltage $V_R$ will continue to rise, thereby increasing the amount of power supplied to the motor 1 and hence its speed and hence the voltage amplitude and frequency of the waveform D. At a time t4 the waveform D will cross the voltage level V2 for the first time but, since the Q output of the slave bistable circuit 63 is low, the state of the master bistable circuit 62 will not change. At a time t5 the waveform D will cross the voltage level V3 for the first time and clock the slave bistable circuit 63, and so the next time the waveform D crosses the voltage level V2 the master bistable circuit 62 will change state. The key pulse producing means G1 will then be operating correctly.

At a time t6 the waveform D will cross the voltage level V1 for the first time. While the waveform D is above the voltage level V1, the waveform K will go to a lower voltage level, the NAND gate G5 will temporarily turn off the current source I5 and the voltage $V_R$ will be temporarily constant. However, when the waveform D first goes above the voltage level V1 in the interval between key pulses at a time t7, a positive sample pulse will appear in the waveform E and the voltage $V_R$ will be raised as a result of comparison with the voltage $V_T$ in the gated on voltage comparator COMP2.

At a time t8 the waveform D will cross the voltage level V4 for the first time in the interval between key pulses. A positive reset pulse will appear in the waveform G, the capacitor $C_T$ will be discharged and the voltage $V_T$ will go down to the negative rail $-V$. The NAND gate G5 will turn off and will turn off the current source I5. The voltage $V_R$ will then remain constant until it is lowered at a time t9 as a result of comparison with the voltage $V_t$ in the gated on voltage comparator COMP2. The voltage $V_T$ in that first comparison after the first reset pulse G will depend on the value of the current supplied by the current source I3 and the duration of the preceeding key pulse. The motor will be at a lower speed than is selected and so the voltage $V_T$ at the end of the key pulse will be higher than that appropriate to the selected speed. However, the voltage $V_T$ will be lower than the voltage $V_R$ at that time, resulting in a lowering of $V_R$ during the comparison by the voltage comparator COMP2. The voltage $V_T$ will also be lower than that required to turn on the NAND gate G5 and so the start-up circuit 11 will cease to be effective.

As the speed of the motor increases, the voltage $V_T$ reached at the end of each key pulse will decrease and the voltage $V_R$ will be lowered during the succeeding sample pulse E until they both stabilise at a value appropriate to the selected speed.

Referring back to FIG. 1, the motor speed control circuit has so far been described in terms of how it will achieve and maintain a selected speed in response to a corresponding value of the current supplied by the current source I3 when it is gated on by the key pulse waveform F. The value of this current is dependent on the speed selection information applied to the inputs IP1, IP2 and IP3, the condition of the distribution timing means 9 and the condition of speed measurement means 10. The normal operation of the circuit in response to speed selection information applied to the inputs IP1, IP2 and IP3 from a programmer will now be described in general terms with reference to FIG. 1 and with reference to FIG. 11 which is a graph of washing machine drum speed against time in response to two typical washing and spin drying programmes.

In the first typical programme, the power supply to the circuit is switched on and a washing signal is applied to the input IP1 of speed selector 12 at the time 10. The speed selector 12 provides a high signal sw in response to which the OR gate G6 provides a high signal TR which resets the distribution timing means 9 so that it supplies an output signal T to the current source I3 at a predetermined low voltage value. The key pulse voltage waveform F, which is established by the start-up circuit 11 as previously described, gates on a first current source within the current source I3 so that it supplies a first current component having a value corresponding to washing speed to the capacitor $C_T$. At the time t1 a washing drum speed of 50 r.p.m. is established and then maintained by the feedback system. At the time t2, the washing signal is removed from the input IP1 and a distribution signal is applied to the input IP2 of the speed selector 12. In response to the distribution signal applied to the input IP2 at the time t2, the speed selector 12 provides a high signal SD to the current source I3. The speed selector 12 also provides a low signal SW in response to which the OR gate G6 provides a low signal TR which enables the distribution timing means 9 so that it provides to the current source I3 an output signal T whose voltage value increases at a predetermined rate for a predetermined period until the time t3 when it supplies a high output signal TE to the speed selector 12. A second current source within the current source I3 is gated by the high signal SD and the key pulse waveform F so that it supplies a second current component which is added to the first current component. The value of the second current component increases from the time t2 to the time t3 in response to the increasing value of the signal T from the distribution timing means 9, and as a result the drum accelerates from the washing drum speed of 50 r.p.m. at the time t2 to a distribution drum speed of 80 r.p.m. at the time t3. During this period, as the drum speed increases it exerts an increasing centrifugal force on the clothes in the drum so that the various items of clothes are successively moved to the wall of the drum as the centrifugal force becomes equal to the force of gravity on each item of clothes. A typical period from t2 to t3 of fifteen seconds will achieve a distribution of the clothes around the drum at the distribution speed of 80 r.p.m. The distribution speed is then maintained by the feedback system. At the time t4 the distribution signal is removed from the input IP2 and a spin dry signal is applied to the input IP3 of the speed selector 12. In response to the spin dry signal applied to the input IP3 and the high signal TE which has been supplied from the distribution timing means 9 since the time t3, the speed selector 12 provides a high signal SS to the current source I3. A third current source within the current source I3 is gated by the high signal SS and the key pulse waveform F so that it supplies a third current component which is added to the first current component. In response to the first and third current components from the current source I3 the drum quickly accelerates to spin dry speed at a time t5, after which it is maintained at spin dry speed by the feedback system.

In the second typical programme, at the time t2 the washing signal is removed from the input IP1 and the spin dry signal is applied to the input IP3 of the speed selector 12. In the absence of the high signal TE from the distribution timing means 9 at the time t2, the speed selector 12 will inhibit a high signal SS and will instead provide a high signal SD to the current source I3. Also a low signal SW will enable the timing means 9 via the OR gate G6. Thus a distribution operation will take place from the time t2 until the time t3. At the time t3 the speed selector 12 will respond to the high signal TE from the distribution timing means 9 to inhibit a high signal SD and instead provide a high signal SS to the current source I3. Thus the times t3 and t4 are coincident in this second case.

The above first typical programme is in response to the requirement for a prolonged operation at distribution speed which involves use of the input IP2 of the speed selector 12. The above second typical programme operates where only the wash input IP1 and the spin dry input IP3 are used. In this case the system reponds to the spin dry command by introducing a mandatory distribution operation at the end of which spin dry speed is immediately enabled. In both cases, adjustment of the reference voltage $V_R$ to a value for spin drying is enabled by the high output signal TE from the distribution timing means 9 with the reference voltage $V_R$ at a value at which the clothes are distributed around the drum.

Referring now to FIG. 12, the speed selector 12 will be described in detail. The presence or absence of a washing signal applied to the output IP1 is transferred directly through the speed selector as a high or low signal SW respectively. The presence of a distribution signal applied to the input IP2 is gated by the OR gate G121 as a high signal SD. A high signal TE which occurs at a predetermined time after the distribution timing means has been enabled is gated by the OR gate G122 to enable the AND gate of G123 and, via the inverter gate G124, to disable the AND gate G125. Thus the presence of a spin dry signal applied to the input IP3 in the presence of a high signal TE is gated by the AND gate G123 as a high signal SS, whereas the presence of a spin dry signal applied to the input IP3 in the absence of a high signal TE (and in the absence of a high signal SC as will be explained later) is gated by the AND gate G125 and the OR gate G121 as a high signal SD.

Referring now to FIG. 13, the distribution timing means 9 will be described in detail. A capacitor $C_D$ and a resistor R6 are connected in series between the negative voltage rail −V and the positive voltage rail OV. A transistor TR8 has its emitter connected to the negative voltage rail −V, its collector connected to the junction of the capacitor $C_D$ and the resistor R6 and its base connected to the output of the OR gate G6. The potential on the side of the capacitor $C_D$ opposite the negative voltage rail −V is applied as the output signal T to the current source I3 and also to a voltage comparator COMP7 where it is compared with a reference voltage V5. In response to a high signal SW (or a high signal PL or a high signal SL as will be explained later), a high potential signal TR from the OR gate G6 turns on the transistor TR8 and the capacitor $C_D$ discharges to bring the signal T and the input to the comparator COMP7 to the potential of the negative voltage rail −V. The output signal TE is then at a low voltage level. In the absence of a high signal TR the transistor TR8 does not conduct so that the capacitor is able to charge towards the positive rail OV via the resistor R6 at a predetermined rate until a predetermined time has elapsed. The voltage level of the signal T is then at a maximum value and the output signal TE of the comparator COMP7 is at a high voltage level.

Referring now to FIG. 14, the current source I3 will be described in detail. The key pulse voltage waveform F gates on the first current source I31 so that it supplies to the capacitor $C_T$ via a resistor $R_W$ of appropriate value, the first current component having a value corresponding to washing speed. The key pulse waveform also enables the AND gate G81 and the AND gate G82. The second current source I32 is gated by the high signal SD and the key pulse waveform F via the AND gate G81. A transistor TR9 has its emitter connected to the output of the current source I32, its base connected to the output T of the distribution timing means 9 and its collector connected to the negative voltage rail −V. A transistor TR10 has its collector connected to the positive voltage rail OV, its base connected to the output of the current source I32 and its emitter connected via a resistor $R_D$ to the capacitor $C_T$. When the current source I32 is gated on, both the transistors TR9 and TR10 conduct and their degree of conduction is determined by the level of the signal T. The second current component supplied via the resistor $R_D$ to the capacitor $C_T$, in addition to the first current component supplied via the resistor $R_W$, increases with the increasing voltage level of the signal T until the output of the current source I3 reaches a maximum value corresponding to distribution speed when the signal T is at its maximum value. The third current source I33 is gated by the high signal SS and the key pulse waveform F via the AND gate G82 so that it supplies, via a resistor $R_S$ of appropriate value, the third current component to the capacitor $C_T$. When the third current component is added to the first current component, the output of the current source I3 is at a value corresponding to spin dry speed.

Referring now to FIG. 1 and to FIG. 15, which is another graph of washing machine drum speed against time, the operation of the circuit in response to interruptions in the AC power supply and in response to a very low speed or apparently very low speed of the motor for reasons other than interruptions in the power supply will be described in general terms. The speed measurement means 10 operates in response to the sample pulse waveform E and the reset pulse waveform G provided by the tachogenerator processor 6 and provides two output signals SC and SL. The output signal SC which is supplied to the speed selector 12 is high or low depending on whether the motor speed is respectively above or below a predetermined critical speed at which the drum speed is above the distribution speed of 80 r.p.m. but below spin drying speed. A typical value of this predetermined critical drum speed is 110 r.p.m. The output signal SL which is supplied to the OR gate G6 is high or low depending on whether the motor speed is, or is apparently, respectively below or above a further predetermined critical speed corresponding to a drum speed considerably below washing speed. A typical value of this further predetermined critical drum speed is 20 r.p.m. A low level power supply detector 13 supplies an output signal PL to the OR gate G6 which is high or low depending on whether the negative voltage rail −V derived from the power supply to the circuit has a value which is respectively less than or greater than a predetermined value which is substantially lower than its normal value.

At the time t6 shown in FIG. 15 the drum is shown at spin speed. Between the times t7 and t8 there is an interruption in the power supply to the circuit. This interruption is of a short duration, due for example to the operation of switches at the power station which provides the AC power supply, such that when the power supply to the circuit is restored the drum speed is above the critical speed of 110 r.p.m. Immediately after the time t8 the low level power supply detector 12 supplies a high level signal PL to the OR gate G6 which supplies a high level signal TR to reset the distribution timing means 9 and a low level output signal TE is thereby provided to the speed selector 12. Then when the waveforms E and G are established the speed measurement means 10 provides a high level signal SC. As will be appreciated by referring back to FIG. 12, a high level signal SC in the absence of a high level signal TE will, via the OR gate G122, enable the AND gate G123 and disable the AND gate G125. Thus the presence of a spin dry signal applied to the input IP3 is gated by the AND gate G123 as a high signal SS to the current source I3. Referring back to FIG. 1, the reference voltage $V_R$ is adjusted to an appropriate value and the drum is quickly brought back to spin drying speed at the time t9.

At the time t10 shown in FIG. 15 the drum is again shown at spin speed. Between the times t11 and t12 there is an interruption of the power supply to the circuit. This interruption is of a long duration, for example due to an accidental disconnection of the circuit from the AC power supply, such that when the power supply to the circuit is restored the drum speed is below the critical speed of 110 r.p.m. Immediately after the time t12 the low level power supply detector 13 supplies a high level signal PL to the OR gate G6 which supplies a high level signal TR to reset the distribution timing means 9 and a low level output signal TE is thereby supplied to the speed selector 12. When the waveforms E and G are established the speed measurement means 10 provides a low level signal SC. As will be appreciated by referring back to FIG. 12, the low level signals SC and TE will, via the OR gate G122, disable the AND gate G123 and enable the AND gate G125. Thus the presence of a spin dry signal applied to the input IP3 is gated by the AND gate G125 and the OR gate G121 as a high level signal SD to the current source I3. As the power supply rises to its normal value, the low level power supply detector 13 supplies a low level signal PL to the OR gate G6. The distribution timing means 9 is thus enabled and its output signal T rises from its initial low level to perform, together with the high level signal SD, a distribution operation. In FIG. 15 the drum speed is shown as falling from the speed which is measured by the speed measurement means shortly after the time t12 to wash speed at a time t13, after which the distribution operation is performed from the wash speed to the distribution speed at a time t14. It should be mentioned here that if the speed of the drum is between the critical speed of 110 r.p.m. and the wash speed of 50 r.p.m. when the power supply is restored at the time t12 it will continue to fall and then be adjusted to wash speed by the first current component from the current source I31 (see FIG. 14) within a very short time. The values of the capacitor $C_D$ in the distribution timing means 9 (see FIg. 13) and the capacitor $C_T$ are chosen such that within this very short time the change in speed of the drum in a normal distribution operation is very small. A substantially normal distribution operation is thus performed after the power interruption just described. Also, if the speed of the drum were below the wash speed of 50 r.p.m. when the power supply is restored at t12, it would be adjusted to wash speed by the first current component from the current source I31 (see FIG. 14) within a very short time, and again a substantially normal distribution operation would be performed after the power interruption. In either case, at the time t13 high output signal TE is supplied by the distribution timing means 9 to the speed selector 12 as a result of which the speed is quickly increased to spin dry speed at the time t15.

At the time t16 shown in FIG. 15, the drum is shown at wash speed. At the time t17 a normal distribution operation begins. This distribution operation is interrupted at the time t18, for example due to a partial stalling of the motor, and the drum speed drops to below the critical speed of 20 r.p.m. at the time t19. The speed measurement means 10 will then supply a high level signal SL to the OR gate G6 which supplies a high level signal TR to reset the distribution timing means 9. Within a short time, via the key pulse waveform F, the first current component from the current source I31 (see FIG. 14) will readjust the drum to wash speed at the time t20. As the drum speed rises above the critical speed of 20 r.p.m. the speed measurement means 10 supplies a low level signal SL to the OR gate G6 and the distribution timing means 9 is enabled to recommence a substantially normal distribution operation substantially at the time t20. The corrective action of a re-distribution operation in response to the speed measurement means 10 supplying a high level signal SL will also occur if the drop in drum speed to below the critical speed of typically 20 r.p.m. occurs from spin drying speed. Furthermore, since the operation of the speed measurement means 10 is entirely dependent on the output waveforms E and G of the tachogenerator processor 6, this corrective action will also occur in response to an apparent drop in drum speed if the tachogenerator is temporarily faulty due to an open circuit during distribution or spin drying.

Referring now to FIG. 16, the speed measurement means 10 will be described in detail. A capacitor $C_S$ and a resistor R7 are connected in series between the negative voltage rail $-V$ and the positive voltage rail OV. A transistor TR11 has its emitter connected to the negative voltage rail $-V$, its collector connected to the junction of the capacitor $C_S$ and the resistor R7 and its base connected to the reset pulse voltage waveform G. The capacitor $C_S$, the resistor R7 and the transistor TR11 constitute a voltage generator whose output is the potential on the side of the capacitor $C_S$ opposite the negative voltage rail $-V$. This output is applied to a voltage comparator COMP8 where it is compared with a reference voltage V6 when the comparator COMP8 is gated on by the sample pulse voltage waveform E. The outputs of the comparator COMP8 are connected to the set and reset inputs, S and R respectively, of a bistable circuit 14 whose $\overline{Q}$ output provides the signal SC. In response to a reset pulse G, the transistor TR11 is turned on and the capacitor $C_S$ discharges to bring the output level of the voltage generator to the potential of the negative voltage rail $-V$. This voltage is less than the reference voltage V6, but since the comparator COMP8 is not gated on at this time the bistable circuit 14 is set and the $\overline{Q}$ output signal SC is low. When the reset pulse G ceases the capacitor $C_S$ is allowed to charge towards the positive rail OV via the resistor R7 at a predetermined rate, and the reference voltage V6 is chosen such that the voltage output level of the capacitor $C_S$ will be less than or greater than the reference voltage V6 depending on whether the drum speed is respectively above or below the critical predetermined value, which is typically 110 r.p.m., when the comparator COMP8 is gated on by the next sample pulse E. If the drum speed is above the critical value at that time then the bistable circuit 14 is reset and the $\overline{Q}$ output signal SC is high. The potential on the side of the capacitor $C_S$ opposite the negative voltage rail $-V$, that is to say the output of the voltage generator, is also applied to the base of a transistor RT12 whose emitter is connected to a reference voltage V7 and whose collector is connected to a resistor R8. The reference voltage V7 is chosen such that the voltage output level of the capacitor $C_S$ will be greater than or less than the reference voltage V7 depending on whether the elapsed time from a reset pulse G is such as to indicate that the drum speed is respectively below or above the critical predetermined value which is typically 20 r.p.m. If the drum speed is indicated to be below that critical value then the transistor TR12 is turned on and provides, via a resistor R8, a high level output signal SL.

Referring now to FIG. 17, the low level power supply detector 13 will be described in detail. The AC power supply to the system (which is typically 240 volts a.c. at 50 Hz) is lowered in voltage, rectified and smoothed by conventional means (not shown) to provide a negative voltage rail $-V$ at a predetermined voltage (typically 8 volts) which is held by a shunt stabiliser consisting of a zener diode D2 and a transistor TR13. The zener diode D2 has its cathode connected to the positive voltage rail OV and its anode connected to the base of the transistor TR13. The collector of the transistor TR13 is connected to the positive voltage rail OV and the emitter of the transistor TR13 is connected to the negative voltage rail $-V$. The anode of the zener diode D2 is connected via a resistor R9 to the base of a transistor TR14 whose emitter is connected to the negative voltage rail $-V$ and whose collector is connected via a resistor R10 to the positive voltage rail OV. When the negative voltage rail $-V$ is at its normal value it is at a high enough voltage for the shunt stabiliser to be in conduction and the transistor TR14 is fully on. In this case a transistor TR15 whose base is connected to the collector of the transistor TR14 and whose collector is connected to the positive voltage rail OV is switched off. However, when the negative voltage rail $-V$ is less than a predetermined value which is substantially lower than its normal value, which occurs immediately after the AC power supply is interrupted and also immediately after the AC power supply is restored, the collector of TR14 is at a sufficiently high potential to switch on the transistor TR15 and thereby provide a high potential level output signal PL.

Some possible modifications within the scope of the invention of the detailed embodiment described above with reference to FIGS. 1 to 17 are as follows. An a.c. series wound electric motor controlled by a triac has been described, the triac being turned on for a period during every half cycle of the AC supply by comparing a ramp waveform with a reference voltage $V_R$. However, the reference voltage $V_R$ may be used in other ways, for example to charge a further capacitor; so as to turn on either the triac or a different solid state controlled switch, for example a thyristor; either in each half cycle or every other half cycle, for example in half-wave rectified operation of a d.c. electric motor; the electric motor being d.c. or a.c. and series wound or shunt wound.

The output voltage $V_T$ of the voltage generator 8 has been described as being compared with a reference voltage $V_R$ on a capacitor $C_R$, the result of the comparison being used to charge or discharge the capacitor $C_R$ to modify the reference voltage $V_R$. A reference voltage can be derived in other ways, for example it can be the voltage at the control electrode of a transistor, and modified in other ways by comparison with the voltage $V_T$.

The circuit 6 for processing the a.c. output of the tachogenerator has been described as comprising the voltage level detection means 61 and the key pulse producing means G1 another gates G2 and G3. Within the circuit 6, the particular form of the key pulse producing means G1, which is driven by two clock inputs derived from two separate voltage levels of the tachogenerator output, is particularly advantageous in providing a degree of noise immunity as has been described. However, a key pulse waveform with the duration of each key pulse being inversely proportional to the rotational speed can be produced by a different form of key pulse producing means, for example a divide-by-two circuit responsive to zero crossing pulses derived from the tachogenerator output.

Furthermore, as an alternative to the circuit 6 which produces the key pulse, sample pulse and reset pulse waveforms, known means for processing a tachogenerator output could be used which consist of a circuit in which the tachogenerator output is rectified and smoothed to give a d.c. output which is a function of the tachogenerator output amplitude. In this case, first the particular form of speed measurement means 10 which has been described could be replaced by an arrangement responsive to the d.c. output level of the tachogenerator to give the signals required to indicate drum speed above the high critical value and below the low critical value; second an alternative form of voltage generator 8 could be provided responsive to ouputs of the speed selector 12, the distribution timing means 9 and the d.c. output level of the tachogenerator to provide an output voltage $V_T$ for the purpose of adjusting the reference voltage $V_R$. And third an alternative form of start-up circuit 11 could be provided responsive to the d.c. output level of the tachogenerator.

The distribution timing means 9 could be realised in a different manner from the detailed form shown in FIG. 13. For example it could include a digital counter and a digital-to-analogue converter which together would be responsive to the output of the OR gate G6 and provide a ramp voltage signal which is applied to the comparator COMP7 and which is applied to the current source I3. Furthermore, although timing of the distribution operation is essential, it is not essential that the motor speed be ramped from wash speed to distribution speed under the control of the circuit. That is to say that the signal T need not be applied to the current source I3. Instead, the distribution output signal SD could gate a current source I32 directly to a resistor $R_d$ (see FIG. 14) so that a fixed current component is supplied for a period determined by the distribution timing means 9. During that period water will be pumped out of the drum in the normal operation of the washing machine and the reducing load of the water in the drum will effectively ensure a suitable ramp of the speed of the drum from washing speed to distribution speed It is essential to the invention that a speed measurement means be provided which indicates whether the drum speed is above or below a critical value which is above the distribution speed but below spin drying speed. The further indication by this speed measurement means as to whether the drum speed is apparently above or below a critical value which is below washing speed is desirable but not essential.

What we claim is:

1. A control circuit for controlling the speed of an electric motor coupled to a tachogenerator and arranged to rotate the clothes drum of a clothes washing and spin drying machine about a non-vertical axis comprising, a controlled solid state switch for connection in series with the motor such that power is supplied as a pulse to the motor while the switch is turned on, means to provide a reference voltage which determines the proportion of time for which the switch is turned on, means for processing the tachogenerator output signal to provide negative feedback information, and means for adjusting said reference voltage in response to both said negative feedback information and speed selection input information, said means for adjusting said reference voltage including distribution timing means which provides a predetermined output signal when a predetermined time has elapsed after it has been enabled and which is reset by an interruption of electrical power to the control circuit, adjustment of said reference voltage to a value for spin drying in response to spin speed selection input information being enabled in normal operation by said predetermined output signal from the distribution timing means with the reference voltage at a value at which the clothes are distributed around the drum, said means for adjusting the reference voltage further comprising speed measurement means responsive to the tachogenerator output for providing a predetermined output signal if the motor speed is above a predetermined critical speed which is above a speed at which clothes are distributed around the drum but below spin drying speed, and gating means responsive to said output signal of the speed measurement means after an interruption of electrical power to the control circuit to enable said reference voltage to be adjusted to said value for spin drying in the absence of said predetermined output signal of the distribution timing means.

2. A circuit as claimed in claim 1 wherein the tachogenerator provides an a.c. output signal whose frequency is proportional to the rotational speed and said means for processing the tachogenerator output signal includes voltage level detection means responsive to said a.c. output signal, key pulse producing means responsive to at least one output of the detection means to produce key pulses whose duration is inversely proportional to the rotational speed, and first gating means responsive to a further output of the detection means and an output of the key pulse producing means to produce a reset pulse after a sample period and in the interval between each key pulse, in which said means for adjusting said reference voltage includes a voltage generator responsive to each reset pulse to provide a predetermined output level and responsive to each key pulse to ramp that output level for the duration of that key pulse at a predetermined rate dependent on said speed selection input information and the condition of said distribution timing means and said speed measurement means, and in which said means for adjusting said reference voltage is adapted to make the adjustment according to the output level of the voltage generator during each sample period.

3. A circuit as claimed in claim 2, in which the detection means is responsive to first and second voltage levels of said tachogenerator a.c. signal of opposite polarity to provide corresponding first and second outputs, and in which the key pulse producing means includes a JK flip-flop comprising a master bistable circuit which is clocked by said first output of the detection means and a slave bistable circuit which is clocked by said second output of the detection means.

4. A circuit as claimed in claim 2, in which said voltage generator includes a capacitor which is charged for the duration of each key pulse by a current having a value corresponding to said predetermined rate.

5. A circuit as claimed in claim 2 further comprising second gating means responsive to an output of the detection means and an output of the key pulse producing means to produce a sample pulse which defines said sample period.

6. A circuit as claimed in claim 5, in which the means to provide a reference voltage includes a capacitor, and in which said means for adjusting said reference voltage includes comparison means responsive to each sample pulse to make a comparison of the output level of the voltage generator with the reference voltage and responsive to a difference between the compared voltages to provide a current of appropriate sense to the capacitor to adjust the reference voltage.

7. A circuit as claimed in claim 6, in which said speed measurement means includes a further voltage generator responsive to each reset pulse to provide a predetermined output level thereof and adapted to ramp its output level at a predetermined rate between the reset pulses, further comparison means responsive to each sample pulse to make a comparison of the output level of said further voltage generator with a voltage level representative of said predetermined critical speed, and a bistable circuit responsive to an output of said further comparison means to provide said predetermined output signal.

8. A circuit as claimed in claim 1 in which said speed measurement means is adapted to provide a further output signal if the tachogenerator output indicates that the motor speed is below a further predetermined critical speed which is below the washing speed, and in which said distribution timing means is also reset by said further output signal.

* * * * *